Sept. 22, 1970    J. R. CRYDER ET AL    3,529,624
RELIEF VALVE
Original Filed May 15, 1967
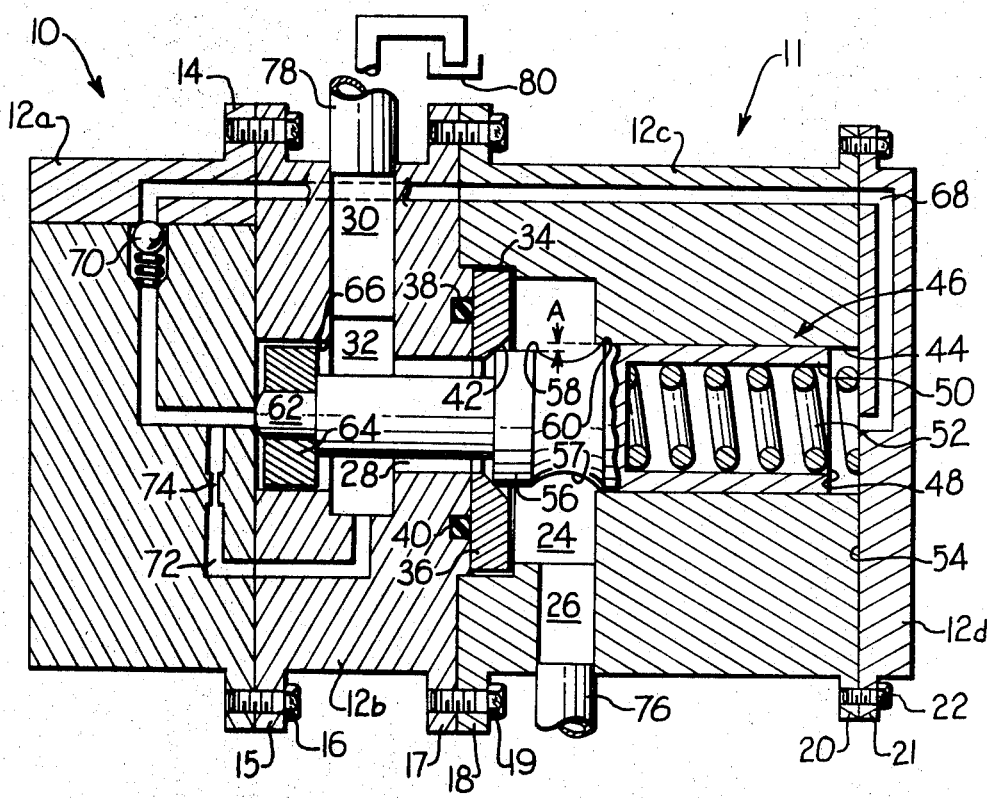
INVENTORS
JOHN R. CRYDER
KIRBY L. STONE
BY
ATTORNEYS

United States Patent Office

3,529,624
Patented Sept. 22, 1970

3,529,624
RELIEF VALVE
John R. Cryder, Joliet, Ill., and Kirby L. Stone, Cincinnati, Ohio, assignors to Caterpillar Tractor Co., Peoria, Ill., a corporation of California
Continuation of application Ser. No. 638,358, May 15, 1967. This application Sept. 3, 1969, Ser. No. 856,895
Int. Cl. F16k 21/10
U.S. Cl. 137—514.5          3 Claims

ABSTRACT OF THE DISCLOSURE

A direct-acting relief valve constructed of a valve housing, which defines a valve chamber. Mounted within the housing is a removable valve seating member, which provides a beveled valve seat facing upon the valve chamber. Reciprocatable within the housing is a valve spool of the poppet type, which spool provides a cylindrical seating portion cooperative with the valve seat. The spool is spring-biased in the direction of the valve seat and is movable away from the valve seat under pressure exerted by fluid in the valve chamber. Damping of the movement of the spool is provided by directing a portion of the fluid in the valve chamber into contact with a piston mounted on the spool.

---

This application is a continuation of applicants' prior copending application Ser. No. 638,358, filed May 15, 1967, now abandoned.

Relief valves of the direct-acting type have been known in the prior art. Such valves have been employed, for example, for the relief of fluid-containing circuits in heavy machinery. These valves have usually been of the cylindrical type; i.e., of the type having a cylindrical spool as the movable valve member. Relief valves have also been employed, which are of the poppet type. In this type of valve, there is utilized a movable valve member in the form of a spool, upon which is machined a valve seat. A valve housing is provided, which bears a sharp corner portion with which the seat is brought into contact.

The known direct-acting relief valves have exhibited a number of disadvantages in their construction and use. In the case of the valves having a cylindrical spool, it has been necessary, for good valve response, to provide a land width between the valve inlet and outlet ports, which is as short as possible. As a consequence, it has proven difficult to obtain a good fit as between the valve spool and its cooperating bore. If the fit is too loose, excessive leakage occurs. On the other hand, if the fit is too tight, the valve spool is caused to chatter. Such chatter results in pressure fluctuations which often lead to premature valve failures.

In the case of the known poppet-type relief valves, continual opening and closing of the valve results in a gouging out of the valve seat, by the cooperating housing corner portion. As a consequence, the differential area of the spool which is exposed to fluid pressure in the protected circuit is substantially reduced. When such seating-in of the valve spool has occurred, it has been necessary to re-machine the spool seat, or to replace the spool altogether.

The present invention provides a relief valve of the direct-acting type, which is designed to overcome the aforementioned disadvantages of the valves of the prior art. In accordance with the invention, a direct-acting relief valve is provided, in which the movable valve member is a spool of the poppet type. The valve seat is provided by a valve seating member which is removably mounted within a valve housing. The valve spool is formed with a seating portion cooperative with the valve seat. The movement of the spool into closed position is damped.

The employment of the poppet type of valve spool serves to avoid the aforementioned problems of leakage and of chatter which have been encountered in the prior art.

The placement of the valve seat on a seating member within the valve housing, serves to avoid the problem of seating-in of valve spool, such as has been encountered in the prior art.

The employment of the replaceable valve seat member enables the easy replacement of the latter, when worn, at comparatively low cost.

The damping of the spool movement serves to prolong the life of the spool and pressure stabilize the valve.

The advantages of the present invention will become apparent from the following description, when read in conjunction with the accompanying drawing.

The drawing is a vertical cross-sectional view, being partly diagrammatic, of a valve constructed in accordance with the invention.

Referring to the drawing, there is shown a valve 10, constructed in accordance with the invention. The valve 10 provides a valve housing 11, which is formed of four sections 12a, 12b, 12c and 12d. Mounted on the section 12a is an inner end, peripherally-extending flange 14. A similar flange 15 is mounted on the section 12b. The sections 12a and 12b are secured together at the flanges 14 and 15, and by means of bolts 16. Similar flanges 17, 18 and bolts serve to secure together the sections 12b and 12c. Similar flanges 20, 21 and bolts 22 secure together the sections 12c and 12d.

Formed in the section 12c is a cylindrical bore providing a valve chamber 24. Also formed in the section 12c is a fluid inlet 26, which is in connection with the chamber 24.

Formed in the section 12b is an auxiliary chamber 28, into which the valve chamber 24 opens. The section 12b is provided with a fluid outlet 30, which connects, through an annulus 32 with the auxiliary chamber 28.

Mounted adjacent the chamber 24, and within a counterbore 34 formed in the section 12c is a valve seating member 36. The seating member 36 is sealed in position by means of a sealing ring 38, which is positioned within a circular inner-end groove 40 provided by the section 12b. The seating member 36 presents a beveled valve seat 42, facing upon the valve chamber 24.

The section 12c is formed with an axially-extending bore 44, which opens into the chamber 24. Reciprocably mounted within bore 44 is a poppet-type valve spool 46. The spool 46 is formed, adjacent one end 48 thereof, with an axial bore 50, within which is mounted a spring 52. The spring 52 bears against the inner surface 54 of the section 12d, and serves to bias the spool 46 in a direction toward the seating member 36.

The spool 46 is provided with a cylindrical seating portion 56, which is normally maintained in a closed position of contact with the valve seat 42, by means of the spring 52. Adjacent the corner 56 and normally positioned within the chamber 24, the spool 46 is provided with a differential surface area 57. As seen at A, the differential surface area 57 is formed as between two axially-spaced-apart points 58 and 60, representing a lesser diameter and a greater diameter of the spool 46, respectively.

Mounted on the spool 46, and secured to an inner-end extension 62 of the latter, is a piston 64. The piston 64 is positioned within a bore 66 provided within the section 12b. A fluid conduit 68 extends through the housing 12, providing connection between the bore 44 in the section 12c and the bore 66 in the section 12a. Positioned within the conduit 68 is a check valve 70 being located at a point fairly close to the bore 66.

A passageway 72 is cut through the sections 12a and 12b, and provides communication between the conduit 68 and the annulus 32. An orifice 74 is formed in the passageway 72 adjacent the point of connection of the latter to the conduit 68.

The valve 10 is connected into a fluid-containing circuit to be protected. The communication is made by means of a conduit 76, which communicates with the inlet port 26. An outlet conduit 78 provides communication between the outlet port 30 and a tank 80.

During the operation of the valve 10, the spool 46, as has previously been indicated, is normally maintained by the spring 52 in the closed position of contact of the seating portion 56 with the valve seat 42. When the fluid pressure in the protective circuit exceeds a predetermined value, the fluid within chamber 24 acts upon the differential area 57 of the spool 46, and forces the latter to move against the force of the spring 52, and into an open position in which the seating portion 56 is separated from the valve seat 42. Fluid may then pass through the conduit 76 and inlet part 26, and into the chamber 24. Such fluid may then pass from the chamber 24, through the auxiliary chamber 28, and to the annulus 32; and from the latter, through the outlet port 30 and the conduit 78 to the tank 80. The fluid pressure in the protected circuit is thus relieved, by the venting of fluid to the tank 80.

The spool 46 when the fluid pressure in the protected circuit has returned to normal, is moved by the spring 52 into its original closed position of seating against the valve seat 42.

Means are provided for damping the return movement of the spool 46. To provide such damping, damping fluid is directed into contact with the piston 64. Such damping fluid represents a small portion of the fluid which has passed through the valve 10. Such fluid portion leaks from the chamber 24, through the bore 44, and into the conduit 68. Such fluid then passes through the conduit 68, through the check valve 70, and into the bore 66. As the spool 46 is moved into closed position, the fluid within the bore 66 serves to resist the movement of the piston 64. The check valve 70 prevents any return passage of the fluid through the conduit 68. The fluid, instead, is drained from the chamber 66 through the passageway 72, and into the annulus 32. The orifice 74 in the passageway 72 serves to control the rate at which the fluid is drained from the bore 66. Damping of the movement of the piston 64, and therefore also of the spool 46, is thus provided.

The valve 10 provides a number of unusual advantages in its construction and use. Through the employment of the poppet-type of spool 46, a valve design which does not present a leakage problem is attained at much lower cost, than has been possible in the prior art. Similarly, a valve design which is free of chatter is obtained at comparatively low cost.

As compared to the poppet-type leakage valve of the prior art, the valve 10 provides a design in which any seating-in of the valve spool 46 does not change the differential area 57. The pressure required for seating of the spool 46, therefore, remains substantially constant throughout the life of the valve 10. The damping effect provided by the piston 64 serves to prolong the life of the valve 10, by reducing the amount of wearing away of the seat 42 and seating portion 56.

As a result of the provision of the replaceable valve seating member 36, the valve seat 42, when worn, can be easily replaced at comparatively low cost. Furthermore this member provides a low cost seat because it is loosely fitted within the chamber that receives it and is free to float or move into alignment with the valve to provide perfect seating before the screws 19 are tightened to bring the body parts firmly together.

What is claimed is:

1. A valve for relieving fluid pressure comprising:
   (a) a valve housing defining a valve chamber, said valve housing being provided with a fluid inlet port and a fluid outlet port, each of said ports connecting with said chamber;
   (b) means providing a valve seat within said valve chamber;
   (c) a poppet-type valve spool, mounted for reciprocation within said valve housing, said spool being spring-biased into a closed position of contact with said valve seat, said spool being adapted for movement in response to a predetermined fluid pressure in said chamber and into an open position of separation from said valve seat, said valve spool being formed with a cylindrical body portion spaced from said seating portion and being of greater diameter than said seating portion, said spool providing a differential surface area located intermediate said seating portion and said body portion, said differential surface area being disposed entirely within said chamber and adapted for contact by fluid within said chamber; and
   (d) the valve spool having a piston thereon, the housing having a chamber therein adjacent the outlet port, the piston being slidably mounted within the chamber, the housing having a first conduit therein, the conduit receiving fluid from the valve chamber and conducting the fluid to the piston chamber, means in the conduit allowing the fluid to pass to the piston chamber and preventing the passage of fluid in the direction of the valve chamber, the housing having a second conduit therein connecting the first conduit to the outlet port and having a restriction therein, the fluid passed by the first conduit acting against the piston to dampen the movement of the valve to closed position only, the second conduit acting to maintain the pressure of the fluid constant against the piston.

2. A valve as set forth in claim 1 wherein said valve seat is provided by a seating member replaceably mounted within said housing and said valve seat is of beveled construction.

3. A valve as set forth in claim 2 wherein the housing has a cylindrical bore therein forming the valve chamber and a counterbore therein, said seating member being sealingly mounted within the counterbore.

References Cited

UNITED STATES PATENTS

| 2,596,368 | 5/1952 | Brunton | 137—53 |
| 2,722,234 | 11/1955 | Macgeorge | 137—620 |
| 3,083,727 | 4/1963 | Douglas | 137—489 |
| 3,204,930 | 9/1965 | Bredtschneider | 251—361 |

WILLIAM F. O'DEA, Primary Examiner

W. H. WRIGHT, Assistant Examiner

U.S. Cl. X.R.

137—514.7, 509; 251—361, 50